US00RE47113E

(19) United States
(12) Reissued Patent
Mallette

(10) Patent Number: US RE47,113 E
(45) Date of Reissued Patent: Nov. 6, 2018

(54) SNOWMOBILE SUSPENSION

(71) Applicant: BOMBARDIER RECREATIONAL PRODUCTS INC., Valcourt (CA)

(72) Inventor: Bertrand Mallette, Sherbrooke (CA)

(73) Assignee: BOMBARDIER RECREATIONAL PRODUCTS INC., Valcourt (CA)

(21) Appl. No.: 15/258,623

(22) Filed: Sep. 7, 2016

Related U.S. Patent Documents

Reissue of:
(64) Patent No.: 9,090,297
Issued: Jul. 28, 2015
Appl. No.: 14/234,285
PCT Filed: Jul. 19, 2012
PCT No.: PCT/US2012/047374
§ 371 (c)(1),
(2) Date: Jan. 22, 2014
PCT Pub. No.: WO2013/016128
PCT Pub. Date: Jan. 31, 2013

U.S. Applications:
(60) Provisional application No. 61/600,291, filed on Feb. 17, 2012, provisional application No. 61/511,263, filed on Jul. 25, 2011.

(51) Int. Cl.
*B62D 55/104* (2006.01)
*B62D 55/112* (2006.01)
(Continued)

(52) U.S. Cl.
CPC ..... *B62D 55/104* (2013.01); *B60G 7/005* (2013.01); *B62D 55/07* (2013.01); *B62D 55/112* (2013.01);
(Continued)

(58) Field of Classification Search
CPC ..... B62M 2027/026; B62M 27/02; B62D 55/104; B62D 55/108; B62D 55/112; B62D 55/07; B60G 2300/322; B60G 7/005
See application file for complete search history.

(56) References Cited

U.S. PATENT DOCUMENTS 3,779,326 A * 12/1973 Trautwein ..... B62M 27/02 180/182
3,885,640 A 5/1975 Valentine et al.
(Continued)

FOREIGN PATENT DOCUMENTS

| | | |
|---|---|---|
| RU | 69825 U1 | 1/2008 |
| SU | 1252234 A1 | 8/1986 |
| WO | 2011075141 A1 | 6/2011 |

OTHER PUBLICATIONS

English translation of description and claims of RU69825U1; retrieved from https://patentscope.wipo.int/ on Sep. 7 2016.
(Continued)

*Primary Examiner* — Peter C English
(74) *Attorney, Agent, or Firm* — BCF LLP

(57) ABSTRACT

A tracked vehicle has a chassis including a tunnel. An engine is connected to the chassis. An endless drive track is disposed below the tunnel and operatively connected to the engine. A suspension assembly supports and tensions the endless drive track. The suspension assembly has a longitudinal direction and a lateral direction. The suspension assembly includes a rail engaging the endless drive track. The rail extends in the longitudinal direction. A suspension arm has an upper end pivotally connected to the chassis about a first lateral axis, and a lower end pivotally connected to the rail about a second lateral axis. At least one shock absorber is connected between the chassis and the rail for biasing the rail away from the chassis. The chassis is pivotally connected to the rail via the suspension assembly about a longitudinally extending axis. A suspension assembly is also disclosed.

30 Claims, 9 Drawing Sheets

(51) Int. Cl.
*B62D 55/07* (2006.01)
*B62M 27/02* (2006.01)
*B60G 7/00* (2006.01)

(52) U.S. Cl.
CPC ..... *B62M 27/02* (2013.01); *B60G 2300/322* (2013.01); *B62M 2027/026* (2013.01)

(56) References Cited

U.S. PATENT DOCUMENTS 4,407,386 A * 10/1983 Yasui et al. ..... B62M 27/02 180/193
4,442,913 A * 4/1984 Grinde ..... B62M 27/02 180/190
4,502,560 A * 3/1985 Hisatomi ..... B62M 27/02 180/190
5,904,216 A * 5/1999 Furusawa ..... B62M 27/02 180/193
6,631,778 B2 * 10/2003 Mallette ..... B62M 27/02 180/193
6,976,550 B2 * 12/2005 Vaisanen ..... 180/190
7,422,083 B2 * 9/2008 Yoshihara et al. ..... 180/182
8,881,856 B2 * 11/2014 Fecteau et al. ..... B62M 27/02 180/193
2013/0175106 A1 * 7/2013 Bedard et al. ..... 180/190

OTHER PUBLICATIONS

Machine translation of http://patents.su/3-1252234-podveska-gusenicy-snegokhoda.html, retrieved Sep. 7, 2016 (https://translate.google.ca/translate?sl=auto&tl=en&js=y&prev=_t&hl=en&ie=UTF-8&u=http%3A%2F%2Fpatents.su%2F3-1252234-podveska-gusenicy-snegokhoda.html&edit-text=).
International Search Report of PCT/US2012/047374, Oct. 19, 2012, Blaine R. Copenheaver.

* cited by examiner

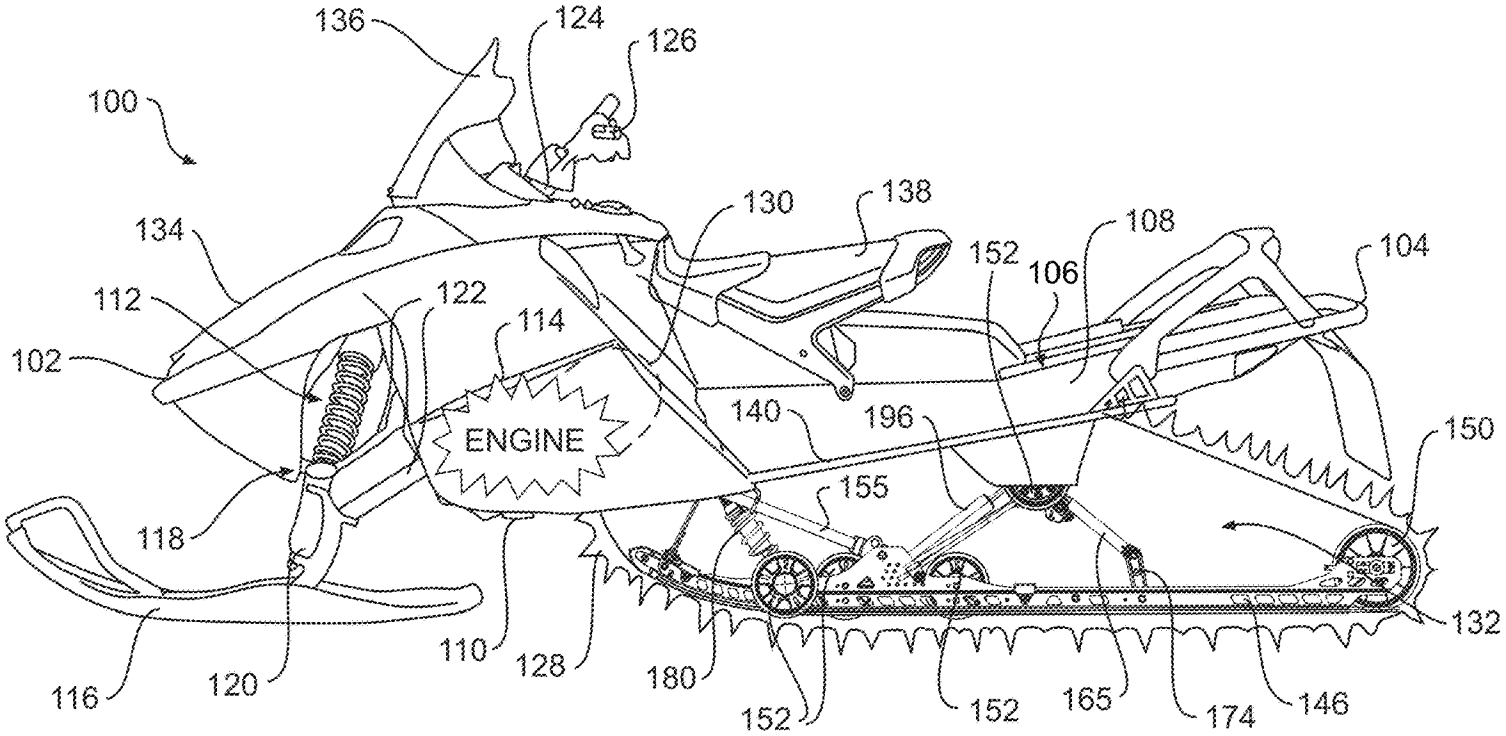
FIG. 1
(AMENDED)

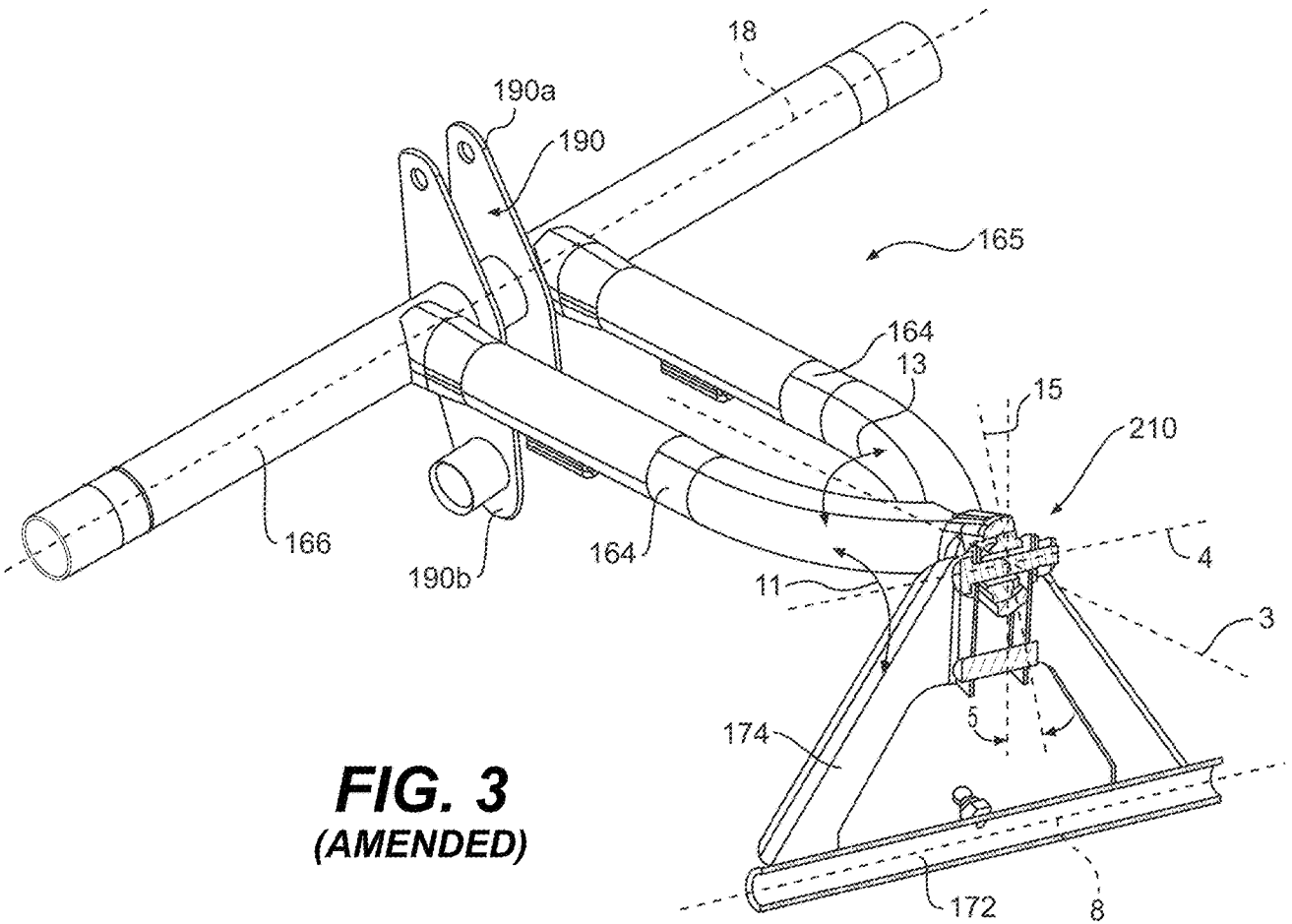
FIG. 3
(AMENDED)

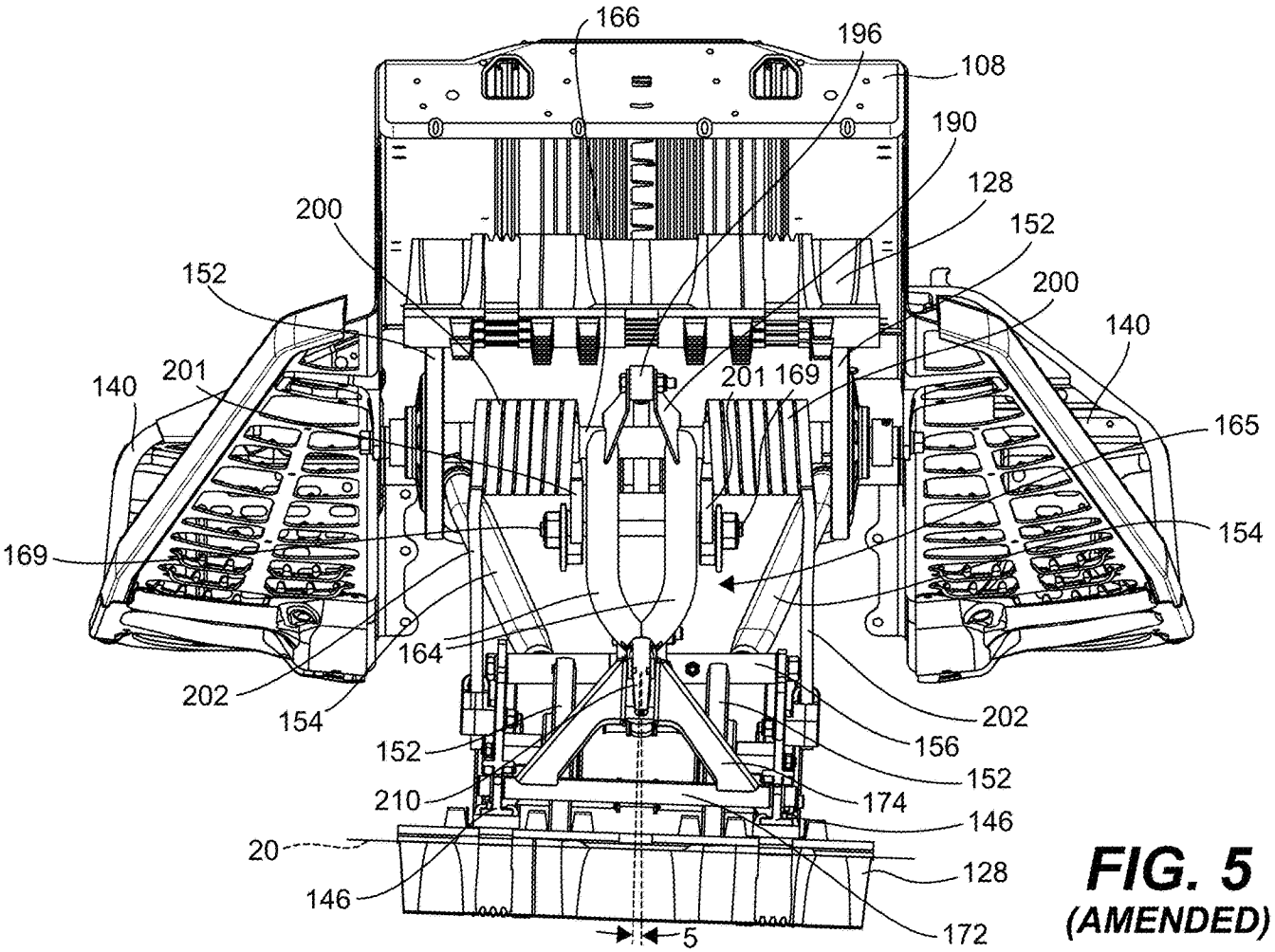
FIG. 5
(AMENDED)

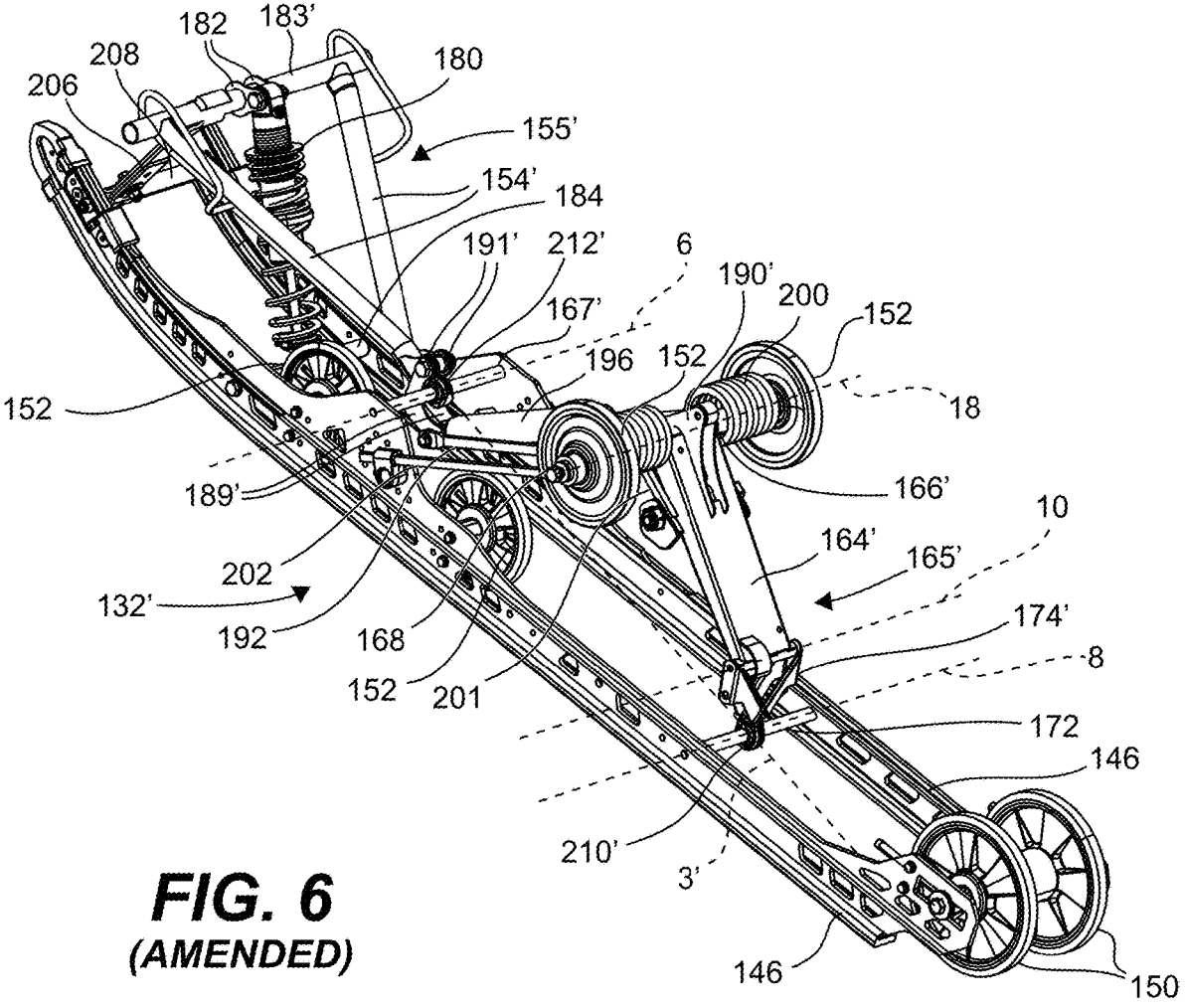
FIG. 6
(AMENDED)

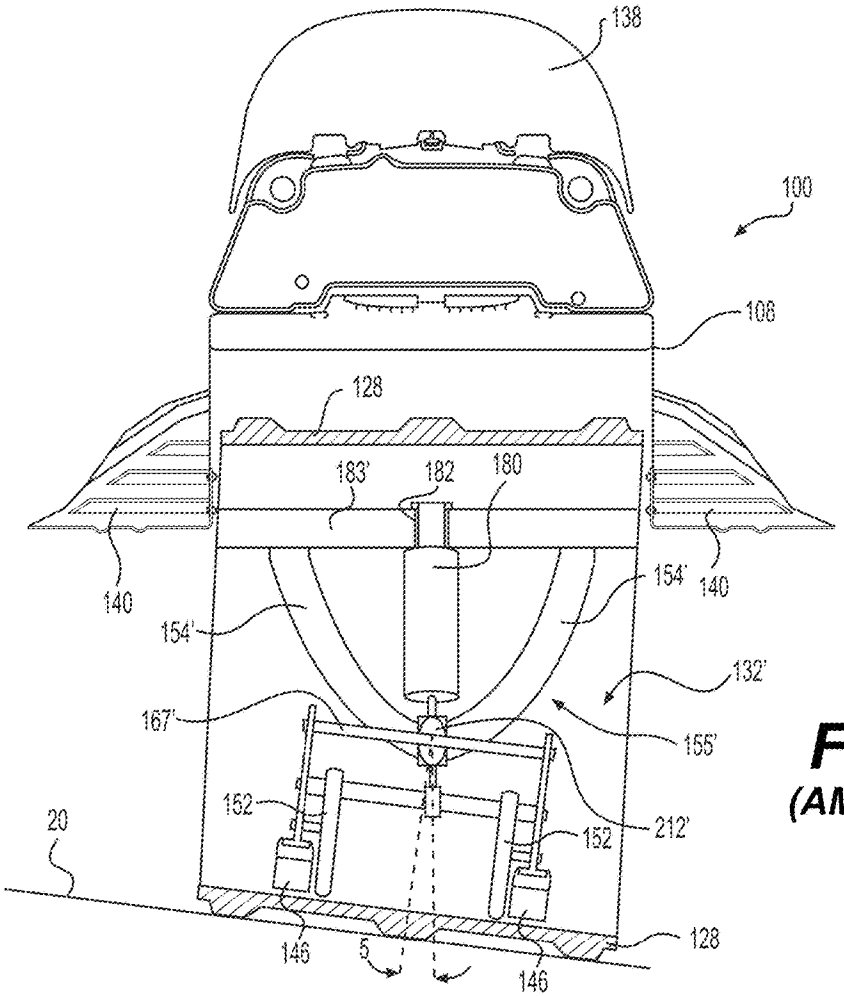
FIG. 7
(AMENDED)

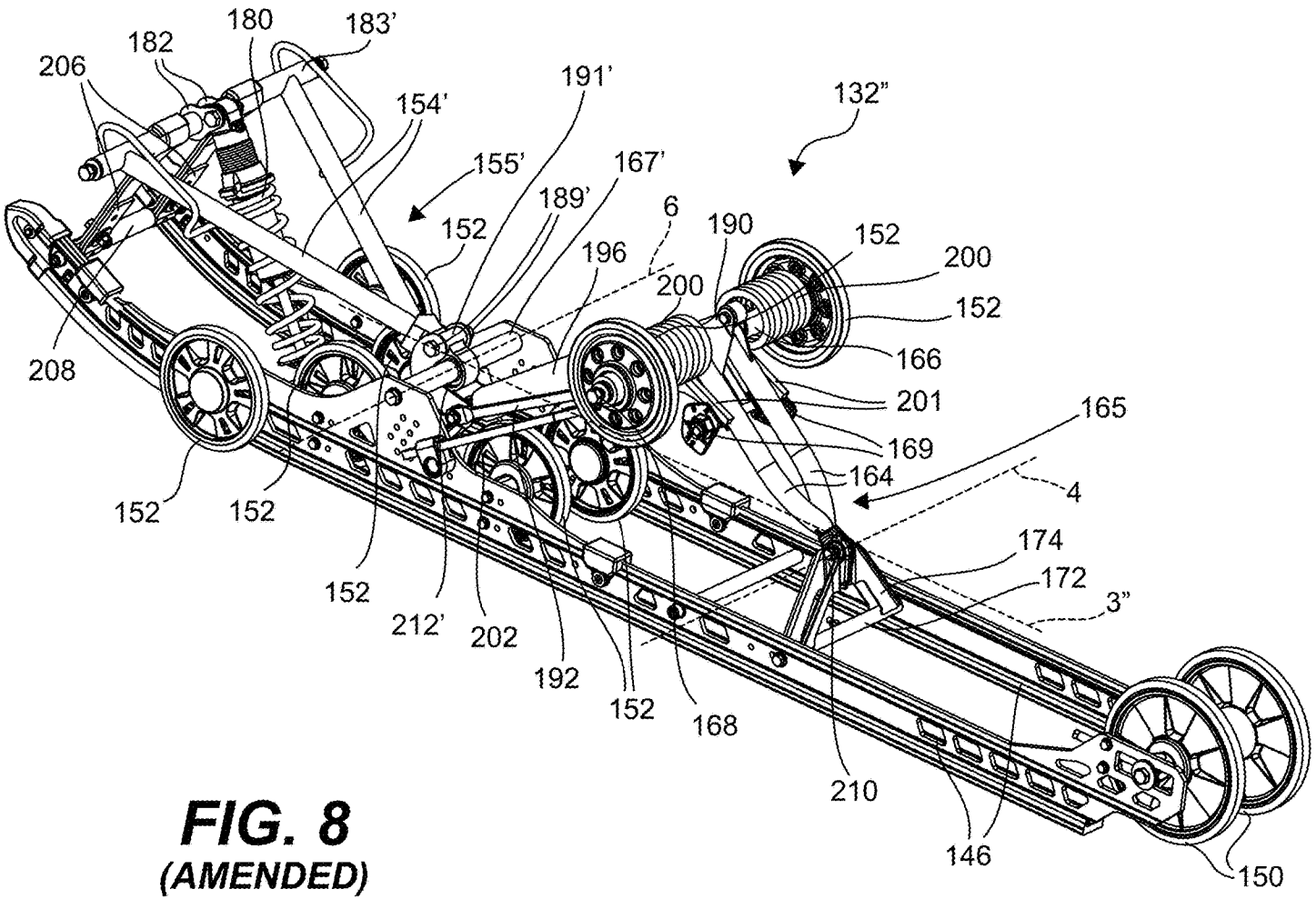
FIG. 8
(AMENDED)

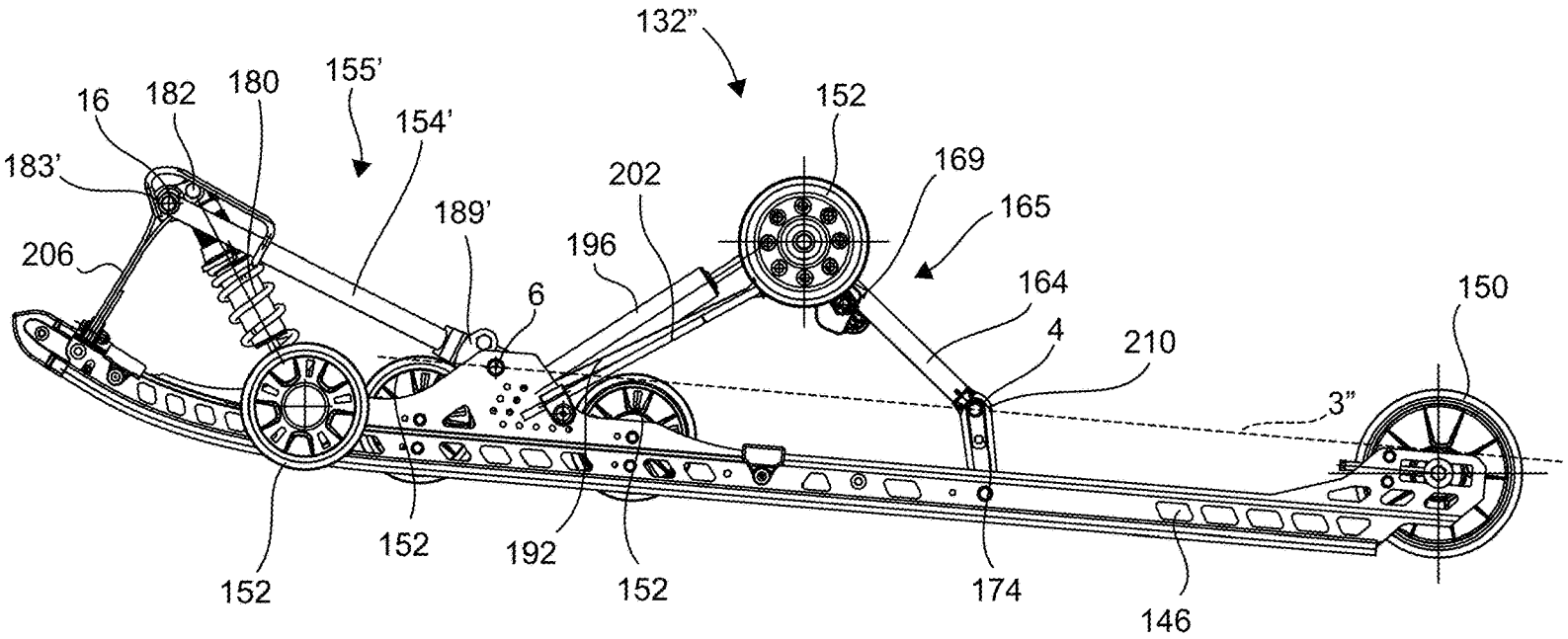
FIG. 9
(AMENDED)

SNOWMOBILE SUSPENSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE

The present application *is a Reissue Application of U.S. Pat. No. 9,090,297 B2, issued Jul. 28, 2015, from application Ser. No. 14/234,285, which is a National Stage Application of International Application No. PCT/US2012/047374, filed Jul. 19, 2012, which* claims priority to U.S. Provisional Patent Application No. 61/600,291, filed Feb. 17, 2012 and U.S. Provisional Patent Application No. 61/511,263, filed Jul. 25, 2011[, the]. *The* entirety of both of [which] *these U.S. Provisional Patent Applications* is incorporated herein by reference.

TECHNICAL FIELD

The present invention relates to suspension assemblies for tracked vehicles, and more particularly to rear suspension assemblies for snowmobiles.

BACKGROUND

Irregularities in the terrain over which a tracked vehicle (such as a snowmobile) travels produce displacements and deflections of its suspension assembly. A conventional suspension supports an endless track, which is tensioned to surround a pair of parallel slide rails, a plurality of idler wheels and at least one drive wheel or sprocket. A shock absorbing mechanism involving springs, hydraulic dampers, and/or other shock absorbing elements, urges the slide frame assembly and the chassis (also known as a frame) of the tracked vehicle apart, against the weight supported above the suspension in a static condition.

When an irregularity such as a bump occurs on the terrain, the suspension allows the slide rails to move toward the tunnel. Similarly, when a depression occurs on the terrain, the suspension allows the slide rails to move away from the tunnel. In some cases, the terrain provides configurations for which the current tracked vehicles (and snowmobiles in particular) cannot or can only minimally accommodate. This is the case, for example, when the tracked vehicle is side-hilling. A tracked vehicle is said to be side-hilling when it is positioned at least partially sideways on a slope. In such a position, an uphill part of the suspension is disposed vertically above a downhill part of the suspension. This can increase the resistance to lean the tracked vehicle into the slope to keep the tracked vehicle horizontal.

Therefore, there is a need for a suspension assembly for a tracked vehicle that allows the tracked vehicle to drive on different terrain configurations. There is also a need for a tracked vehicle having such a suspension.

SUMMARY

One object of the present is to ameliorate at least some of the inconveniences of the prior art.

In one aspect of the present, a suspension assembly for a tracked vehicle is provided. The suspension assembly has a chassis and an endless drive track. The suspension assembly has a longitudinal direction and a lateral direction. The suspension assembly comprises a rail adapted for engagement with the endless drive track. The rail is extending in the longitudinal direction. A first suspension arm has an upper end and a lower end. The upper end of the first suspension arm is adapted for pivotally connecting to the chassis about a first lateral axis. The lower end of the first suspension arm is pivotally connected to the rail about a second lateral axis. The first suspension arm is extending forwardly and upwardly from the rail. A second suspension arm is disposed rearwardly of the first suspension arm. The second suspension arm has an upper end and a lower end. The upper end of the second suspension arm is adapted for pivotally connecting to the chassis about a third lateral axis. The lower end of the second suspension arm is pivotally connected to the rail about a fourth lateral axis. The second suspension arm is extending forwardly and upwardly from the rail. At least one shock absorber is connected between the chassis and the rail for biasing the rail away from the chassis. At least a portion of at least one of the first and second suspension arms is pivotable about a longitudinally extending axis relative to the rail.

In a further aspect, at least one ball joint is pivotally connecting the at least one of the first and second suspension arms to the rail.

In an additional aspect, the at least one of the first and second suspension arms includes the second suspension arm. The lower end of the second suspension arm is pivotally connected to the rail about the longitudinally extending axis.

In a further aspect, a rocker arm has an upper end and a lower end. The upper end of the rocker arm is pivotally connected to the lower end of the second suspension arm about a fifth lateral axis. The lower end of the rocker arm is pivotally connected to the rail about the fourth lateral axis.

In an additional aspect, a ball joint pivotally connects the lower end of the rocker arm to the rail about the fourth lateral axis and the longitudinally extending axis.

In a further aspect, a ball joint pivotally connects the lower end of the second suspension arm to the upper end the rocker arm about the fifth lateral axis and the longitudinally extending axis.

In an additional aspect, the at least one of the first and second suspension arms is pivotable about the longitudinally extending axis by a roll angle. The roll angle is between 0 and 10 degrees with respect to vertical.

In a further aspect, the roll angle is between 0 and 3 degrees with respect to vertical.

In an additional aspect, the at least one of the first and second suspension arms includes the first suspension arm and the second suspension arm.

In a further aspect, a first ball joint is pivotally connecting the lower end of first suspension arm to the rail about the second lateral axis and the longitudinally extending axis. A second ball joint is pivotally connecting the lower end of second suspension arm to the rail about the fourth lateral axis and the longitudinally extending axis.

In another aspect of the present, a tracked vehicle is provided. The tracked vehicle comprises a chassis including a tunnel. An engine is connected to the chassis. An endless drive track is disposed below the tunnel and operatively connected to the engine for propulsion of the tracked vehicle. A suspension assembly is supporting and tensioning the endless drive track. The suspension assembly has a longitudinal direction and a lateral direction. The suspension assembly includes a rail engaging the endless drive track.

The rail is extending in the longitudinal direction. A suspension arm has an upper end and a lower end. The upper end of the suspension arm is pivotally connected to the chassis about a first lateral axis. The lower end of the suspension arm is pivotally connected to the rail about a second lateral axis. At least one shock absorber is connected between the chassis and the rail for biasing the rail away from the chassis. The chassis is pivotally connected to the rail via the suspension assembly about a longitudinally extending axis.

In a further aspect, the lower end of the suspension arm is pivotally connected to the rail about the longitudinally extending axis.

In an additional aspect, a ball joint is pivotally connecting the lower end of the suspension arm to the rail.

In a further aspect, a rocker arm has an upper end and a lower end. The upper end of the rocker arm is pivotally connected to the lower end of the suspension arm about a third lateral axis. The lower end of the rocker arm is pivotally connected to the rail about the second lateral axis.

In an additional aspect, the ball joint pivotally connects the lower end of the rocker arm to the rail about the second lateral axis and the longitudinally extending axis.

In a further aspect, the ball joint pivotally connects the lower end of the suspension arm to the upper end the rocker arm about the third lateral axis and the longitudinally extending axis.

In an additional aspect, the lower end of the suspension arm is pivotable about the longitudinally extending axis by a roll angle. The roll angle is between 0 and 10 degrees with respect to vertical.

In a further aspect, the roll angle is between 0 and 3 degrees with respect to vertical.

In an additional aspect, the tracked vehicle is a snowmobile. The suspension assembly is a rear suspension assembly. At least one ski is operatively connected to the chassis by a front suspension.

In yet another aspect of the present, a snowmobile is provided. The snowmobile comprises a chassis including a tunnel. The tunnel has a longitudinal direction. An engine is connected to the chassis. At least one ski is connected to the chassis by a front suspension. An endless drive track is disposed below the tunnel and is operatively connected to the engine for propulsion of the snowmobile. A rear suspension assembly is supporting and tensioning the endless drive track. The chassis is pivotally connected to the endless drive track via the rear suspension assembly about a longitudinally extending axis.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the tunnel or the suspension assemblies for example, should be understood as they would be understood when these components or sub-assemblies are mounted to the vehicle.

Embodiments of the present invention each have at least one of the above-mentioned object and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a left side elevation view of a snowmobile;

FIG. 3 is a cross-sectional view of a portion of the suspension assembly of FIG. 2 taken along line 3-3 of the suspension assembly of FIG. 2;

FIG. 5 is a lateral cross-section of a portion of the snowmobile of FIG. 1 having the suspension assembly of FIG. 2 shown while side-hilling;

FIG. 6 is a perspective view taken from a rear, left side of a second embodiment of a suspension assembly of the snowmobile of FIG. 1;

FIG. 7 is a schematic lateral cross-section of a portion of the snowmobile of FIG. 1 having the suspension assembly of FIG. 6 shown while side-hilling;

FIG. 8 is a perspective view taken from a rear, left side of a third embodiment of a suspension assembly of the snowmobile of FIG. 1; and FIG. 9 is left side elevation view of the suspension assembly of FIG. 8.

DETAILED DESCRIPTION

Figure 2:
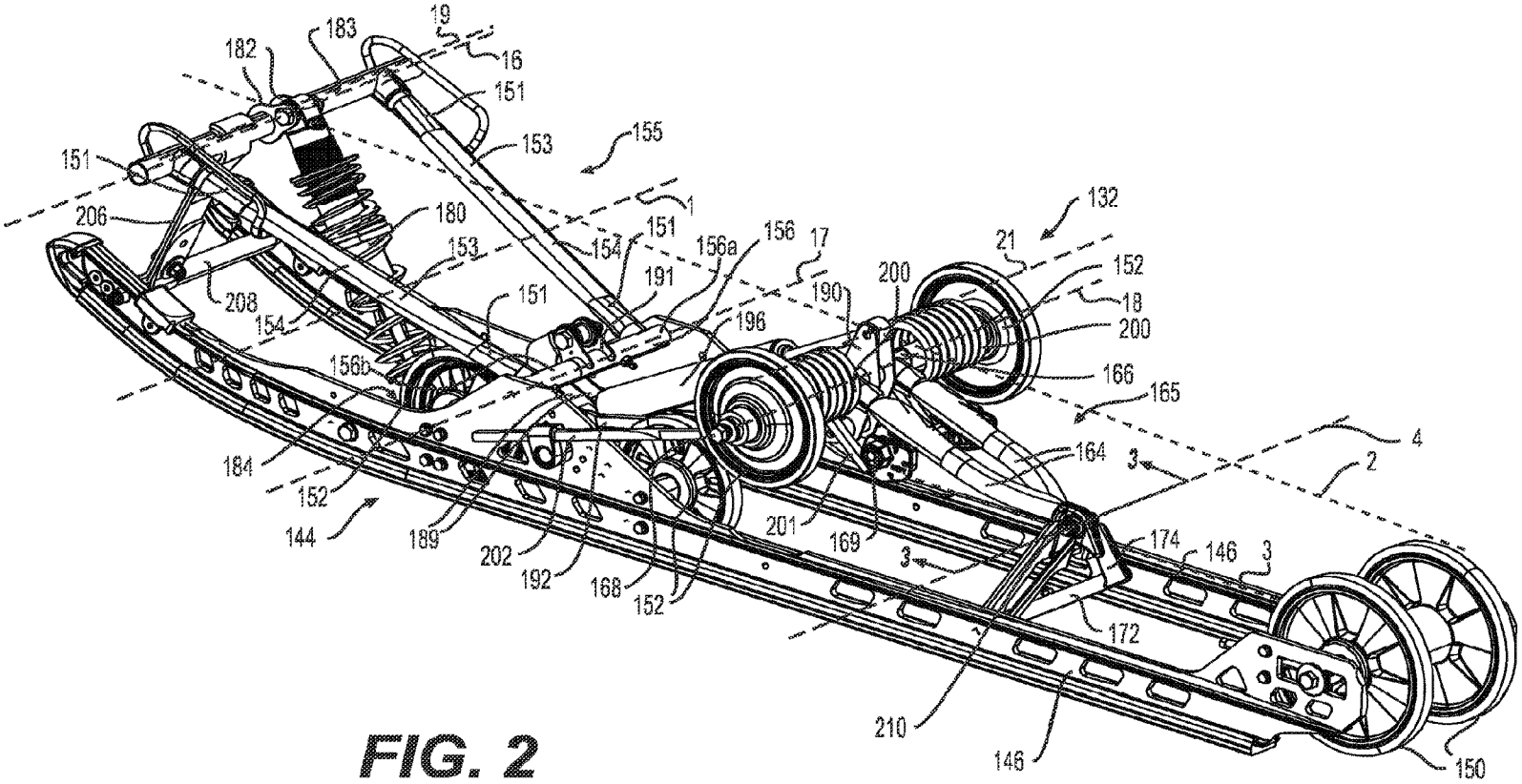
FIG. 2 is a perspective view taken from a rear, left side of a first embodiment of a suspension assembly of the snowmobile of FIG. 1.

Referring to FIG. 1, a snowmobile 100 will be described. Although a snowmobile is presented herein. It is contemplated that aspects of the present could be applied to other types of tracked vehicles.

The snowmobile 100 includes a front end 102 and a rear end 104, which are defined consistently with the forward travel direction of the vehicle. The snowmobile 100 includes a chassis 106. The chassis 106 includes a tunnel 108, an engine cradle portion 110 and a front suspension assembly portion 112. An engine 114 which is schematically illustrated, is carried by the engine cradle portion 110 of the chassis 106. A ski and steering assembly is provided, in which two skis 116 (only one of which is shown) are positioned at the front end 102 of the snowmobile 100, and are attached to the front suspension assembly portion 112 of the chassis 106 through a front suspension assembly 118. The front suspension assembly 118 includes ski legs 120, supporting arms 122 and ball joints for operatively joining the respective ski legs 120, supporting arms 122 and a steering column 124. The steering column 124 is attached at its upper end to a steering device, in this case a handlebar 126, which is positioned forward of a rider and behind the engine 114 to rotate the ski legs 120 and thus the skis 116, in order to steer the vehicle. It is contemplated that the snowmobile 100 could have only one ski 116.

An endless drive track 128 is positioned at the rear end 104 of the snowmobile 100 and is disposed under the tunnel 108. The endless drive track 128 is operatively connected to the engine 114 through a belt transmission system 130 which is schematically illustrated by broken lines. Thus, the endless drive track 128 is driven to run about a rear suspension assembly 132 for propulsion of the snowmobile 100. The rear suspension assembly 132 has a lateral direction 1 and a longitudinal direction 2 (both shown in FIG. 2). The rear suspension assembly 132 will be described in greater detail below.

At the front end 102 of the snowmobile 100, there are provided fairings 134 that enclose the engine 114 and the belt transmission system 130, thereby providing an external shell that not only protects the engine 114 and the belt transmission system 130, but also make the snowmobile 100 more aesthetically pleasing. The fairings 134 include a hood and one or more side panels which are all openable to allow access to the engine 114 and the belt transmission system 130 when this is required. Easy access may be required for example for inspection or maintenance of the engine 114 and/or the belt transmission system 130. A windshield 136 is connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 is connected to and disposed on the tunnel 108. A rear portion of the seat 138 may include a storage compartment, or may be used to accept a passenger seat. Two foot rests 140 (only one of which is shown) are positioned on opposed sides of the snowmobile 100 below the seat 138 to accommodate the rider's feet.

The endless drive track 128 is engaged with and driven by a drive sprocket (not shown) which is journaled by the tunnel 108 and is driven by the engine 114 through the belt transmission system 130. The endless drive track 128 is suspended for movement relative to the chassis 106, by the rear suspension assembly 132, as will be described below.

The snowmobile 100 includes other components which will not be described in detail herein.

Referring to FIGS. 2 to 5, a first embodiment of the rear suspension assembly 132 will now be described.

The rear suspension assembly 132 includes a slide frame assembly 144 which includes a pair of spaced apart slide rails 146 that engage the inner side of the endless drive track 128. The slide frame assembly 144 journals two idler rollers *or wheels* 150. *As can be seen in FIG. 2, the wheels 150 are rotationally connected to the pair of slide rails 146 between the pair of slide rails 146.* In addition, further rollers *or wheels* 152 are carried by the tunnel 108 and the slide rails 146 (some of which have been omitted in the Figures for clarity), in order to define the path over which the endless drive track 128 travels.

Figure 4:
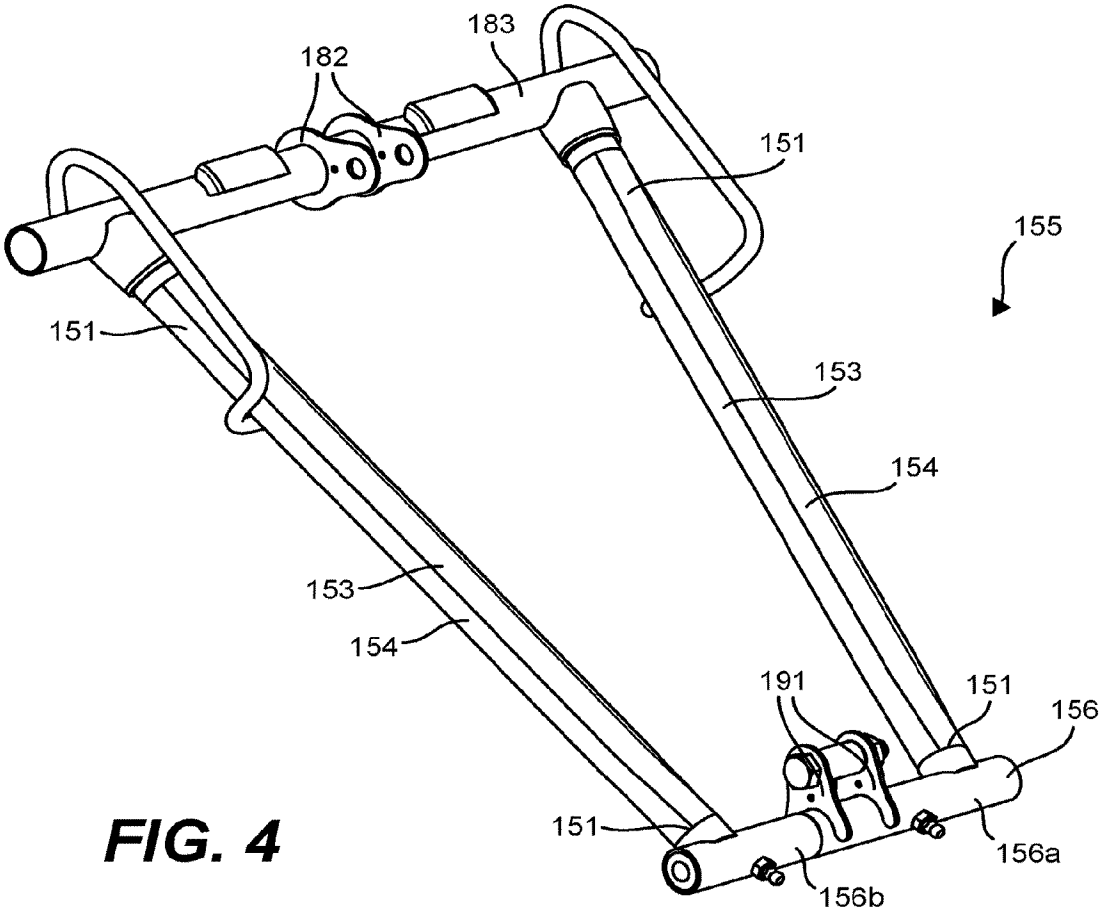
FIG. 4 is a perspective view taken from a rear, left side of a front suspension arm of the front suspension assembly of FIG. 2.

As can be seen in FIG. 4, a front suspension arm 155 includes two front arms 154, a tube 183, and a tube 156. It is contemplated that the front suspension arm 155 could have more or less elements than described above. For example, the front suspension arm 155 could have only one front arm 154.

As can be seen in FIG. 2, the front arms 154 extend downwardly and rearwardly from a front portion of the tunnel 108. Upper ends of the front arms 154 are pivotally attached to the tunnel 108 via the tube 183 so as to pivot about a lateral axis 16. The tube 183 is welded to the front arms 154 and extends therebetween. The lower ends of the front arms 154 are each pivotally attached to their respective slide rails 146 of the slide frame assembly 144 via the tube 156 so as to pivot about a lateral axis 17. The tube 156 is cut into two portions: a right portion 156a and a left portion 156b. This reduces the torsional rigidity of the front suspension arm 155. The movement of front portions of the slide rails 146 relative to the tunnel 108 of the chassis 106 causes the front arms 154 to rotate relative to the tunnel 108 about a lateral axis.

As best seen in FIG. 4, the front arms 154 have an arm body 153 that has flattened top and bottom surfaces, and ends 151 that have a cross-section transitioning from a flattened cross-section of the arm body 153 to a round cross-section for connection to the tube 183 and tube 156. As a result, the front arms 154 have a smaller moment of inertia near their centers than at their ends 151. It is contemplated that the front arms 154 could not have the flattened top and bottom surfaces. For example, the front arms 154 could have a generally circular cross-section throughout. The front arms 154 are made of metal tubes. It is also contemplated that the front arms 154 could be made of a material other than metal.

The rear suspension arm 165 includes two rear arms 164, a tube 166 and a bracket 190. It is contemplated that the rear suspension arm 165 could have more or less elements than described above. For example, the rear suspension arm 165 could have only one rear arm 164.

The rear arms 164 extend downwardly and rearwardly from a rear portion of the tunnel 108, and are disposed rearward of the front arms 154. The rear arms 164 are made of metal tubes of a general circular cross-section. It is contemplated that the rear arms 164 could have other shapes of cross-section. It is also contemplated that the rear arms 164 could be of a material other than metal. The rear arms 164 are pivotally attached to the tunnel 108 of the chassis 106 by means of a tube and shaft assembly. The tube and shaft assembly includes the tube 166 rotatably supported by a shaft 168 which is mounted at the opposite ends thereof to the tunnel 108. The shaft 168 supports the rollers 152 supporting an upper portion of the endless drive track 128. Upper ends of the rear arms 164 are welded to the tube 166, so that the rear arms 164 are adapted to pivot about the shaft 168. The upper ends of the rear arms 164 pivot relative to the tunnel 108 about a lateral axis 18.

Lower ends of the rear anus 164 are welded together and are pivotally connected to a rocker arm 174 by a ball joint 210. *As can be seen, the wheels 150 are disposed rearward of the rocker arm 174.* The rocker arm 174 is an inverted V-shaped member pivotally connected to the slide rails 146 by a hollow-cross bar 172. The hollow cross bar 172 extends in the lateral direction 1 between the slide rails 146 *to connect the slide rails 146 to each other* and define a lateral axis of rotation *8* of the rocker arm 174. The ball joint 210 will be described below. It is contemplated that the lower ends of the rear arms 164 could not be welded together and would be each pivotally connected a corresponding rocker arm.

A front shock absorber assembly 180 disposed between the tunnel 108 (via the tube 183) and the slide frame assembly 144 extends rearwardly and downwardly from the front portion of the tunnel 108. The front shock absorber assembly 180 is disposed partially forward of the front arms 154 and completely forward of the axis 17. A lower end of the first shock absorber assembly 180 is disposed forwardly of the lower ends of the front arms 154. The front shock absorber assembly 180 is a damping unit which includes a hydraulic damper and a coil spring for absorbing the impact energy when impact forces are applied to the opposite ends of the damping unit. The coil spring biases the damping unit toward an extended position so that the hydraulic damper is in a position to absorb the impact energies. Since shock absorber assemblies of the type of the shock absorber assembly 180 are well known in the art, it will not be further described herein. It is contemplated that the hydraulic damper and/or the coil spring could be omitted.

The front shock absorber assembly 180 is operatively attached at an upper end thereof to the tunnel 108 by a shaft and front bracket assembly comprising the tube 183 and two brackets 182. The two brackets 182 are fixedly connected to the tube 183 near a center of the tube 183. The upper end of the front shock absorber assembly 180 is pivotally connected to the brackets 182 about a lateral axis 19 such that an axial force is applied to the upper end of the front shock absorber assembly 180 when the front arms 154 move with respect to the tunnel 108. The connection between the upper end of the front shock absorber assembly 180 and the brackets 182 provides some play between these parts such that the shock absorber assembly 180 can pivot (i.e. roll) slightly relative to the brackets 182 about a generally longitudinal axis.

The front shock absorber assembly 180 is pivotally connected to a lower end thereof to the slide frame assembly 144 via a shaft 184. A bearing or bushing (not shown) is disposed around the shaft 184 and inside an aperture (not shown) in the lower end of the front shock absorber assembly 180. The shaft 184 is fixedly connected to the left and right slide rails 146, extending between them in the lateral direction 1. The front shock absorber assembly 180 is adapted to rotate about the shaft 184. The bearing or bushing provides some play between the shaft 184 and the lower end of the front shock absorber assembly 180 such that the shaft 184 can pivot (i.e. roll) slightly relative to the lower end of the front shock absorber assembly 180 about a generally longitudinal axis. It is contemplated that the bearing or bushing could be replaced by a connector providing two or more degrees of freedom such as a ball joint for example. It is contemplated that the front shock absorber assembly 180 could be connected to other parts of the snowmobile 100.

The rear shock absorber 196 extends forwardly and downwardly from the rear portion of the tunnel 108, and is disposed at least in part rearwardly of the front arms 154. The rear shock absorber 196, similar to the hydraulic damper of the front shock absorber assembly 180, is well known in the art, and therefore will not be described in detail. The rear shock absorber 196 is pivotally connected at its upper end to the tunnel 108 about a lateral axis 21 via the rear an upper portion 190a (FIG. 3) of the bracket 190 mounted on the tube 166 and the shaft 168 assembly of the rear arms 164. The rear shock absorber 196 is pivotally connected at its lower end to generally L-shaped brackets 189. The L-shaped brackets 189 are pivotally connected to brackets 191 (best seen in FIG. 4) that are fixedly connected to the right portion 156a of the tube 156. Two rods 192 are pivotally connected at their upper ends to a lower portion 190b (FIG. 3) of the bracket 190 and at their lower ends to the L-shaped brackets 189. The lower ends of the rods 192 and of the rear shock absorber 196 are pivotally connected to the L-shaped brackets 189 about a common lateral pivot axis. The rear shock absorber 196 is disposed laterally between the rods 192.

The rear bracket 190 is fixedly connected to the tube 166. As mentioned above, the tube 166 is rotatable over the shaft 168. It is contemplated that the rear bracket 190 could be two rear brackets.

Left and right torsion springs 200 are provided in order to push the slide frame assembly 144 apart from the tunnel 108 of the chassis 106, and to maintain the front and rear shock absorber assemblies 180, 196 substantially in an extended condition when no substantial loads are applied thereon. The left and right torsion springs 200 surround the tube 166 at each end thereof. A first free end 201 (only one being shown in FIG. 2) of each of the torsion springs 200 abuts a corresponding knob 169, and a second free end 202 of each of the torsion springs 200 abuts the slide rails 146. The knob 169 can be rotated to adjust tension in the torsion springs 200.

Left and right flexible tension straps 206 (only the left one being shown) are attached at their upper ends to the tube 183, and are attached at their lower ends to the slide frame assembly 144 by means of a cross bar 208 which extends between the slide rails 146 and is attached at its opposite ends to the front ends of the slide rails 146. The flexible tension straps 206 prevent the slide frame assembly 144 from being pushed too far away from the tunnel 108.

Turning now to FIG. 3, the ball joint 210 rotatably connecting the lower ends of the rear arms 164 to the rocker arm 174 will be described in more detail. The ball joint 210 is a two degrees of freedom joint which allows the lower ends of the rear arms 164 to rotate about a lateral axis 4 (as illustrated by arrow 11) and about a longitudinally extending axis 3 (as illustrated by arrow 13). The longitudinally extending axis 3 passes through axes 4 and 17 (FIG. 2) *and is laterally centered between the slide rails 146*. Since the axis 17 is fixed relative to the slide rails 146 and the axis 4 moves relative to the slide rails 146 as the suspension assembly 132 is compressed and extended (due to the movement of rocker arm 174), the longitudinally extending axis 3 pivots about the axis 17 as the suspension assembly 132 is compressed and extended. The ball joint 210 is a standard ball joint and details of its structure will not be described herein.

Because the ball joint 210 allows the lower ends of the rear suspension arm 165 to rotate about the longitudinally extending axis 3, the rear suspension assembly 132 is allowed to roll generally about the longitudinally extending axis 3. The chassis 106 rolls relative to the drive track 128. This can occur for example, when side-hilling as shown in FIG. 5. When the snowmobile 100 is side-hilling, the ball joint 210 allows the tunnel 108 to remain substantially horizontal, while the slide rails 146 and the portion of the endless drive track 128 they abut (i.e. the ground contacting portion) pivot about the longitudinally extending axis 3 so as to be disposed at an angle with respect to the tunnel 108 in order to remain in contact with a ground 20 having a moderate slope. When side-hilling, the wheels 150, 152 connected to the slide rails 146, the cross bars 172, 208, the shaft 184 and the rocker arm 174 also pivot about the longitudinally extending axis 3 so as to be disposed at an angle with respect to the tunnel 108. *As such, the rear suspension arm 165 moves from a first position relative to the rocker arm 174 where the lateral axis 18 is parallel to the lateral axis 8 to a second position relative to the rocker arm 174 where the lateral axis 18 is angled relative to the lateral axis 8*. FIG. 3 shows the ball joint 210 positioned such that the rocker arm 174 is at a roll angle 5 of 2 degrees with respect to a vertical 15. It is contemplated that the roll angle 5 could be between 0 and 10 degrees with respect to the vertical 15. It is also contemplated that the roll angle 5 could be between 0 and 3 degrees with respect to the vertical 15. It should be understood that should the slope of the ground be greater than the maximum roll angle 5 permitted by the ball joint 210, that the tunnel 108 and the elements connected thereto also lean relative to the vertical. It should also be understood that suspension assembly 132 allows the slide rails 146, the portion of the endless drive track 128 they abut, the wheels 150, 152 connected to the slide rails 146, the cross bars 172, 208 and the rocker arm 174 to remain generally parallel to the ground and permit the driver to cause the tunnel 108 and at least the portions of the snowmobile 100 connected directly thereto to roll about the longitudinally extending axis 3 such as when leaning in a turn.

It is contemplated that the lower ends of the rear suspension arm 165 could be pivotally connected to a rocker arm 174 by a joint other than a ball joint. For example, the lower ends of the rear arms 164 could be pivotally connected to a rocker arm 174 about a lateral axis and a longitudinally extending axis by a universal joint. In another example, the lower ends of the rear arms 164 are pivotally connected to a rocker arm 174 by two one degree of freedom joints (one for the lateral direction 1 and one for the longitudinal direction 2) joined to each other in series. It is contemplated that the ball joint 210 could pivotally connect the rocker arm 174 to the slide rails 146, and that the rear arms 164 could be pivotally connected to the rocker arm 174 only about the lateral axis 4. It is contemplated that the rocker arm 174 could be omitted and the rear arms 164 could be pivotally connected directly to the cross bar 172 by the ball joint 210, a universal joint or two one degree of freedom joints joined to each other in series. It is also contemplated that the rocker arm 174 could be replaced by two rocker arms, one for each of the rear arms 164. It is contemplated that the ball joint 210 could pivotally connect to another part of the rear arms 164. For example, the ball joint 210 could pivotally connect the upper end of the rear arms 164 to the tunnel 108. Alternatively, each rear arm 164 could be made of two sections pivotally connected to each other so as to permit pivoting about a longitudinally extending axis.

As mentioned above, the front arms 154 have a variable cross-section. The variable cross-section alone or when combined with the split tube 156, allows the front arms 154 to be flexible about the longitudinally extending axis 3 so as to permit rolling between the chassis 106 and the slide rails 146 when the rear suspension arm 165 rolls. It is also contemplated that slight roll of a portion of the front suspension arm 155 relative to the tunnel 108 could be achieved by ways other than modifying a cross-section of the front arms 154.

Referring now to FIGS. 6 and 7, a second embodiment of a rear suspension assembly, rear suspension assembly 132', will now be described. Elements common to both the rear suspension assembly 132 and the rear suspension assembly 132' have been given the same reference numerals and will not be described in greater detail again herein.

A front suspension arm 155' includes two front arms 154', and a tube 183'. It is contemplated that the front suspension arm 155' could have more or less elements than described above.

The front arms 154' extend downwardly and rearwardly from a front portion of the tunnel 108. Upper ends of the front arms 154' are pivotally connected to the tunnel 108 in a manner similar as the one described above with respect to the front arms 154. Lower ends of the front arms 154' are welded to each other and are both pivotally connected by a front ball joint 212' to a shaft 167' extending laterally between the slide rails 146. The front ball joint 212' is similar to the ball joint 210 described above. The front ball joint 212' allows the front suspension arm 155' to rotate about a lateral axis 6 and the longitudinally extending axis 3'. The longitudinally extending axis 3' passes through the lateral axis 6 and the lateral axis 8 described below. It is contemplated that the lower ends of the front arms 154' could be pivotally connected the slide rails 146 by a joint other than a ball joint. For example, the lower ends of the front arms 154' could be pivotally connected to the slide rail 146 by a universal joint. In another example, the lower ends of the front arms 154' are pivotally connected to the slide rails 146 by two one degree of freedom joints (one for the lateral direction 1 and one for the longitudinal direction 2) joined to each other in series. It is contemplated that the front ball joint 212' could pivotally connect to another part of the front suspension arm 155'. For example, the front ball joint 212' could pivotally connect the upper ends of the front arms 154' to the tunnel 108.

The front arms 154' are made of metal tubes. The front arms 154' have a circular cross-section throughout. It is contemplated that the front arms 154' could have a variable cross-section. It is also contemplated that the front arms 154' could have other shapes of cross-section, and that the front arms 154' could be of a material other than metal.

The rear shock absorber 196 is pivotally connected at its upper end to an upper portion of a bracket 190'. The rear shock absorber 196 is pivotally connected at its lower end to generally L-shaped brackets 189'. The L-shaped brackets 189' are pivotally connected to brackets 191' that are fixedly connected to the arms 154'. The two rods 192 are pivotally connected at their upper ends to a lower portion of the bracket 190' and at their lower ends to the L-shaped brackets 189'. The lower ends of the rods 192 and of the rear shock absorber 196 are pivotally connected to the L-shaped brackets 189' about a common lateral pivot axis.

A rear suspension arm 165' includes a single rear arms 164', a tube 166' and a bracket 190'. It is contemplated that the rear suspension arm 165' could have more or less than described above. For example, the rear suspension arm 165' could have two rear arms 164'.

The rear arm 164' extends downwardly and rearwardly from the rear portion of the tunnel 108, and is disposed rearward of the front arms 154'. The rear arm 164' is made of bent sheet metal. It is contemplated that the rear arm 164' could have a different shape, and that the rear arm 164' could be of a material other than metal. The upper end of the rear arm 164' is pivotally attached to the tunnel 108 in a manner similar to the rear arms 164.

A lower end of the rear arm 164' is pivotally connected to a rocker arm 174' about a lateral axis 10. The rocker arm 174' is a V-shaped member. The rocker arm 174' is pivotally connected to the slide rails 146 by a rear ball joint 210'. The rear ball joint 210' is similar to the ball joint 210 described above. The rear ball joint 210' allows the rear suspension arm 165' to rotate about a lateral axis 8 and the longitudinally extending axis 3'. *The longitudinally extending axis 3' is laterally centered between the slide rails 146.* Since the lateral axes 6 and 8 are fixed relative to the slide rails 146, the longitudinally extending axis 3' also remains fixed as the suspension assembly 132' is compressed and extended. It is contemplated that the lower end of the rocker arm 174' could be pivotally connected to the slide rails 146 by a joint other than a ball joint. For example, the lower end of the rocker arm 174' could be pivotally connected to the slide rails 146 by a universal joint. In another example, the lower end of the rocker arm 174' is pivotally connected to the slide rails 146 by two one degree of freedom joints joined to each other in series. It is contemplated that the rear ball joint 210' could pivotally connect the rear arm 164' to the rocker arm 174', and that the rocker arm 174' could be pivotally connected to the slide rails 146 only about the lateral axis 8. It is contemplated that the rocker arm 174' could be omitted and that the rear arm 164' could be pivotally connected directly to the cross bar 172 by the rear ball joint 210', a universal joint or two one degree of freedom joints joined to each other in series. It is contemplated that the rear ball joint 210' could pivotally connect to another part of the rear suspension arm 165'. For example, the rear ball joint 210' could pivotally connect the upper end of the rear arm 164' to the tunnel 108. It is also contemplated that the rear ball joint 210' could be omitted, and that the rear suspension arm 165' may be adapted to compensate for a rotation about the longitudinally extending axis 3' induced by the front ball joint 210' by bending for example. It is also contemplated that the ball joints 210', 212' could be different from each other.

The ball joints 210' and 212' allow parts of the rear suspension assembly 132' to roll with respect to the tunnel 108 at a roll angle 5 between 0 and 10 degrees with respect to a vertical. *As such, the rear suspension arm 165' moves from a first position where the lateral axis 18 is parallel to the lateral axis 8 to a second position 174 where the lateral axis 18 is angled relative to the lateral axis 8.* The ball joints 210' and 212' allow some roll, and the slide rails 146 may, for example, remain in contact with the ground 20 when the snowmobile 100 is side-hilling on a hill having a moderate slope. This is illustrated for the ball joint 212' in FIG. 7. When side-hilling, the slide rails 146, the portion of the endless drive track 128 they abut (i.e. the ground contacting portion), the wheels 150, 152 connected to the slide rails 146, the cross bars 172, 208 and the shaft 184 pivot about the longitudinally extending axis 3' relative to the tunnel 108. When side-hilling, the front suspension arm 155', the rear suspension arm 165', the rear shock absorber 196 and the rods 192 do not pivot about the longitudinally extending axis 3' relative to the tunnel 108.

Referring now to FIGS. 8 and 9, a third embodiment of a rear suspension assembly, rear suspension assembly 132", will now be described. Elements common to the rear suspension assembly 132, the rear suspension 132' and the rear suspension assembly 132" have been given the same reference numerals and will not be described in greater detail again herein.

The rear suspension assembly 132" has the front suspension arm 155' and associated elements described above with respect to the rear suspension assembly 132'. The rear suspension assembly 132" also has the rear suspension arm 165, the rocker arm 174 and associated elements described above with respect to the rear suspension assembly 132. The rear shock absorber 196 and the rods 192 are connected at their upper ends to the bracket 190 and at their lower ends to the brackets 189'.

In this embodiment, the front suspension arm 155' and the rear suspension arm 165 can pivot relative to the slide rails 146 about a longitudinally extending axis 3". The longitudinally extending axis 3" passes through the ball joints 210, 212', the lateral axis 6 and the lateral axis 4 *and is laterally centered between the slide rails 146*. Since the axis 6 is fixed relative to the slide rails 146 and the axis 4 moves relative to the slide rails 146 as the suspension assembly 132" is compressed and extended (due to the movement of rocker arm 174), the longitudinally extending axis 3" pivots about the axis 6 as the suspension assembly 132" is compressed and extended. As can be seen in FIG. 9, when then suspension arms 155' and 165 are not pivoted relative to the slide rails 146 about the longitudinally extending axis 3", a plane (corresponding to the line labelled 3" in FIG. 9) containing the longitudinally extending axis 3" and the lateral axes 4, 6, passes through the wheels 150 and at least some of the wheels 152 connected to the slide rails 146.

The ball joints 210 and 212' allow parts of the rear suspension assembly 132" to roll with respect to the tunnel 108 at a roll angle between 0 and 10 degrees with respect to a vertical. The ball joints 210 and 212' allow some roll, and the slide rails 146 may, for example, remain in contact with the ground 20 when the snowmobile 100 is side-hilling on a hill having a moderate slope. When side-hilling, the slide rails 146, the portion of the endless drive track 128 they abut (i.e. the ground contacting portion), the wheels 150, 152 connected to the slide rails 146, the cross bars 172, 208, the shaft 184 and the rocker arm 174 pivot about the longitudinally extending axis 3" relative to the tunnel 108. When side-hilling, the front suspension arm 155', the rear suspension arm 165, the rear shock absorber 196 and the rods 192 do not pivot about the longitudinally extending axis 3" relative to the tunnel 108.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A suspension assembly for a tracked vehicle having a chassis and an endless drive track, the suspension assembly having a longitudinal direction and a lateral direction, the suspension assembly comprising:

a pair of rails adapted for engagement with the endless drive track, the rails extending in the longitudinal direction;

a first suspension arm having an upper end and a lower end, the upper end of the first suspension arm being adapted for pivotally connecting to the chassis about a first lateral axis, the lower end of the first suspension arm being pivotally connected to the rails about a second lateral axis, the first suspension arm extending forwardly and upwardly from the rails;

a second suspension arm disposed rearwardly of the first suspension arm, the second suspension arm having an upper end and a lower end, the upper end of the second suspension arm being adapted for pivotally connecting to the chassis about a third lateral axis;

a rocker arm having an upper end and a lower end, the lower end of the rocker arm being pivotally connected to the rails about a fourth lateral axis, the upper end of the rocker arm being pivotally connected to the lower end of the second suspension arm about a fifth lateral axis, the second suspension arm extending forwardly and upwardly from the rocker arm;

at least one shock absorber connected between the chassis and the rails for biasing the rails away from the chassis, at least a portion *of* the second suspension arm being pivotally connected to the rails about a longitudinally extending axis relative to the rails, the longitudinally extending axis being laterally centered between the rails; and a ball joint pivotally connecting the lower end of the second suspension arm to the upper end of the rocker arm about the fifth lateral axis and the longitudinally extending axis.

2. The suspension assembly of claim 1, wherein the second suspension arm is pivotable about the longitudinally extending axis by a roll angle, and the roll angle is between 0 and 10 degrees with respect to vertical.

3. The suspension assembly of claim 2, wherein the roll angle is between 0 and 3 degrees with respect to vertical.

4. The suspension assembly of claim 1, further comprising another ball joint pivotally connecting the lower end of *the* first suspension arm to the rails about the second lateral axis and the longitudinally extending axis.

5. A tracked vehicle comprising:

a chassis including a tunnel;

an engine connected to the chassis;

an endless drive track disposed below the tunnel and operatively connected to the engine for propulsion of the tracked vehicle;

a suspension assembly supporting and tensioning the endless drive track, the suspension assembly having a longitudinal direction and a lateral direction, the suspension assembly including:

a pair of rails engaging the endless drive track, the rails extending in the longitudinal direction;

a suspension arm having an upper end and a lower end, the upper end of the suspension arm being pivotally connected to the chassis about a first lateral axis;

a rocker arm having an upper end and a lower end, the lower end of the rocker arm being pivotally connected to the rails about a second lateral axis, the upper end of the rocker arm being pivotally connected to the lower end of the suspension arm about a third lateral axis;

at least one shock absorber connected between the chassis and the rails for biasing the rails away from the chassis, the chassis being pivotally connected to the rails via the suspension assembly about a longitudinally extending axis, the longitudinally extending axis being laterally centered between the rails; and a ball joint pivotally connecting the lower end of the suspension *arm* to the upper end of the rocker arm about the third lateral axis and the longitudinally extending axis.

6. The tracked vehicle of claim 5, wherein the lower end of the suspension arm is pivotable about the longitudinally extending axis by a roll angle, and the roll angle is between 0 and 10 degrees with respect to vertical.

7. The tracked vehicle of claim 6, wherein the roll angle is between 0 and 3 degrees with respect to vertical.

8. The tracked vehicle of claim 5, wherein the tracked vehicle is a snowmobile, the suspension assembly is a rear suspension assembly; and further comprising at least one ski operatively connected to the chassis by a front suspension.

9. A snowmobile comprising:

a chassis including a tunnel, the tunnel having a longitudinal direction;

an engine connected to the chassis;

at least one ski connected to the chassis by a front suspension;

an endless drive track disposed below the tunnel and operatively connected to the engine for propulsion of the snowmobile; and the rear suspension assembly of claim 1 supporting and tensioning the endless drive track.

10. A suspension assembly for a tracked vehicle having a chassis and an endless drive track, the suspension assembly having a longitudinal direction and a lateral direction, the suspension assembly comprising:

a pair of rails adapted for engagement with the endless drive track, the rails extending in the longitudinal direction;

a first suspension arm having an upper end and a lower end, the upper end of the first suspension arm being adapted for pivotally connecting to the chassis about a first lateral axis, the lower end of the first suspension arm being pivotally connected to the rails about a second lateral axis, the first suspension arm extending forwardly and upwardly from the rails;

a second suspension arm disposed rearwardly of the first suspension arm, the second suspension arm having an upper end and a lower end, the upper end of the second suspension arm being adapted for pivotally connecting to the chassis about a third lateral axis;

a rocker arm having an upper end and a lower end, the lower end of the rocker arm being pivotally connected to the rails about a fourth lateral axis, the upper end of the rocker arm being pivotally connected to the lower end of the second suspension arm about a fifth lateral axis, the second suspension arm extending forwardly and upwardly from the rocker arm;

at least one damper connected to at least one of the chassis and the rails;

at least one spring connected to at least one of the chassis, the rails, and the at least one damper, at least a portion *of* the second suspension arm being pivotally connected to the rails about a longitudinally extending axis relative to the rails, the longitudinally extending axis being laterally centered between the rails; and a ball joint pivotally connecting the lower end of the second suspension arm to the upper end of the rocker arm about the fifth lateral axis and the longitudinally extending axis.

11. The suspension assembly of claim 10, wherein the second suspension arm is pivotable about the longitudinally extending axis by a roll angle, and the roll angle is between 0 and 10 degrees with respect to vertical.

12. The suspension assembly of claim 11, wherein the roll angle is between 0 and 3 degrees with respect to vertical.

13. The suspension assembly of claim 10, further comprising another ball joint pivotally connecting the lower end of first suspension arm to the rails about the second lateral axis and the longitudinally extending axis.

14. A rear assembly for a suspension assembly for a tracked vehicle having a chassis and an endless drive track, the rear assembly comprising:

a pair of rails adapted for engagement with the endless drive track;

a suspension arm having an upper end and a lower end, the upper end being adapted for pivotally connecting to the chassis about a first lateral axis; and a rocker arm pivotally connected to the pair of rails about a second lateral axis, the rocker arm being pivotally connected to the lower end of the suspension arm about a longitudinally extending axis, the suspension arm having at least one first position relative to the rocker arm where the first lateral axis is parallel to the second lateral axis, and the suspension arm having at least one second position relative to the rocker arm where the first lateral axis is angled relative to the second lateral axis.

15. The rear assembly of claim 14, wherein the rocker arm has an upper end and a lower end, the lower end of the rocker arm being pivotally connected to the pair of rails about the second lateral axis, the upper end of the rocker arm being pivotally connected to the lower end of the suspension arm about the longitudinally extending axis.

16. The rear assembly of claim 15, further comprising a ball joint pivotally connecting the lower end of the suspension arm to the upper end of the rocker arm.

17. The rear assembly of claim 16, wherein the suspension arm is a rear suspension arm; and the rear assembly further comprising a front suspension arm having an upper end and a lower end, the upper end of the front suspension arm being adapted for pivotally connecting to the chassis about a third lateral axis.

18. The rear assembly of claim 17, wherein the ball joint is a first ball joint; and the rear assembly further comprising a second ball joint connected to the lower end of the front suspension arm, the second ball joint being adapted for pivotally connecting the front suspension arm to the pair of rails [of the suspension assembly].

19. The rear assembly of claim 18, further comprising a shock absorber having an upper end connected to the rear suspension arm.

20. The rear assembly of claim 14, further comprising at least one cross bar disposed between and connected to the pair of rails, the at least one cross bar [fixedly] connecting the pair of rails to each other.

21. The rear assembly of claim 14, further comprising wheels rotationally connected to the pair of rails;

wherein the wheels are disposed between the pair of rails and rearward of the rocker arm.

*22. A tracked vehicle comprising:*

*a chassis including a tunnel;*

*an engine connected to the chassis;*

*an endless drive track disposed below the tunnel and operatively connected to the engine for propulsion of the tracked vehicle;*

*a suspension assembly supporting and tensioning the endless drive track, the suspension assembly having a longitudinal direction and a lateral direction, the suspension assembly including:*

*a pair of rails engaging the endless drive track, the pair of rails extending in the longitudinal direction;*

*a suspension arm having an upper end and a lower end, the upper end of the suspension arm being pivotally connected to the chassis about a first lateral axis;*

*a rocker arm having an upper end and a lower end, the lower end of the rocker arm being pivotally connected to the pair of rails about a second lateral axis, the rocker arm being pivotally connected to the lower end of the suspension arm,*

*the suspension arm having at least one first position where the first lateral axis is parallel to the second lateral axis, and*

*the suspension arm having at least one second position where the first lateral axis is angled relative to the second lateral axis; and*

*at least one shock absorber connected between the chassis and the rails for biasing the rails away from the chassis, the chassis being pivotally connected to the rails via the suspension assembly about a longitudinally extending axis.*

*23. The tracked vehicle of claim 22, wherein the tracked vehicle is a snowmobile, the suspension assembly is a rear suspension assembly; and*

*further comprising at least one ski operatively connected to the chassis by a front suspension.*

*24. The tracked vehicle of claim 22, wherein the at least one first position is at least one first position relative to the pair of rails and the at least one second position is at least one second position relative to the pair of rails.*

*25. The tracked vehicle of claim 24, further comprising a ball joint pivotally connecting the lower end of the rocker arm to the pair of rails.*

*26. The tracked vehicle of claim 25, wherein the suspension arm is a rear suspension arm; and*

*the suspension assembly further comprising a front suspension arm having an upper end and a lower end, the upper end of the front suspension arm being pivotally connected to the chassis about a third lateral axis.*

*27. The tracked vehicle of claim 26, wherein the ball joint is a first ball joint; and*

*the suspension assembly further comprises a second ball joint connected to the lower end of the front suspension arm, the second ball joint pivotally connecting the front suspension arm to the pair of rails.*

*28. The tracked vehicle of claim 27, wherein an upper end of the shock absorber is connected to the rear suspension arm.*

*29. The tracked vehicle of claim 22, further comprising at least one cross bar disposed between and connected to the pair of rails, the at least one cross bar connecting the pair of rails to each other.*

*30. The tracked vehicle of claim 22, further comprising wheels rotationally connected to the pair of rails;*

*wherein the wheels are disposed between the pair of rails and rearward of the rocker arm.*

* * * * *